United States Patent [19]

Goel

[11] Patent Number: 4,663,302
[45] Date of Patent: May 5, 1987

[54] BICYCLIC AMIDE ACETAL MODIFIED CATALYSTS FOR POLYURETHANE POLYMER FORMATION

[75] Inventor: Anil B. Goel, Worthington, Ohio
[73] Assignee: Ashland Oil, Ashland, Ky.
[21] Appl. No.: 913,904
[22] Filed: Oct. 1, 1986
[51] Int. Cl.⁴ ............................................. B01J 31/04
[52] U.S. Cl. .................................. 502/167; 502/165; 528/54
[58] Field of Search ............................. 502/165, 167

[56] References Cited

U.S. PATENT DOCUMENTS

| | | | |
|---|---|---|---|
| 3,450,648 | 6/1969 | Windehuth et al. | 502/167 X |
| 4,200,699 | 4/1980 | Treadwell | 502/167 X |
| 4,547,478 | 10/1985 | Chang | 502/167 X |
| 4,601,995 | 7/1986 | Goel | 502/167 X |

Primary Examiner—Patrick P. Garvin
Attorney, Agent, or Firm—John F. Jones

[57] ABSTRACT

A catalyst composition which is useful in the preparation of polyurethanes by reaction of polyols with polyisocyanates is prepared by the reaction of a metal salt having the formula $MX_n$ wherein M represents potassium, zinc, copper, nickel, cobalt, iron, bismuth, lead, vanadium, or antimony, X represents a carboxylate group having from 2 to 20 carbon atoms, a halogen or an alkoxide group having from 1 to 20 carbon atoms, and n is a number equal to the valence state of M with a bicyclic amide acetal having the formula

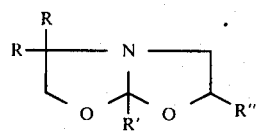

wherein R, R" and R' independently represent hydrogen, an alkyl group having from 1 to 20 carbon atoms, an alkyl ether group having from 1 to 20 carbon atoms, an aryl group having from 6 to 12 carbon atoms, an aryl ether group having from 6 to 12 carbon atoms, an alkaryl group having from 7 to 20 carbon atoms or an alkaryl ether group having from 7 to 20 carbon atoms.

9 Claims, No Drawings

BICYCLIC AMIDE ACETAL MODIFIED CATALYSTS FOR POLYURETHANE POLYMER FORMATION

This invention relates to the process for formation of modified metal ion catalysts, said catalysts being useful in the formation of polyurethanes, by the reaction of bicyclic amide acetals with certain metal ion catalysts such as bismuth octoate and to the process for formation of polyurethane polymers by the reaction of polyols and polyisocyanates in the presence of these modified catalysts.

Many metal containing catalysts including zinc, iron, cobalt, nickel, vanadium, potassium, bismuth, lead and other metal carboxylates have been used in the prior art as polyurethane polymerization catalysts (J. H. Saunders and K. C. Frisch, "Polyurethanes Chemistry and Technology," Krieger Pub., 1983, p. 129). Generally, the most commonly used metal carboxylate salts are highly viscous liquids which undergo slow degradation upon standing, thus giving inconsistant catalytic activities when used in polyurethane formation. The formation of polyurethanes occurs when polyols are allowed to react with polyisocyanates to give polymers which can be either linear or cross linked as is well known in the art. It is known that some of the metal salts and particularly the metal halides, alkoxides and carboxyates generally tend to undergo slow degradation upon standing under atmospheric conditions.

I have discovered that a variety of metal catalysts of the aforementioned types can be modified by reaction with bicyclic amide acetals so that they give improved curing rates and improved processing ease when employed in the polyol/polyisocyanate polymerization reaction to form polyurethanes. I have discovered that metals salts having the general formula $MX_n$, wherein M represents potassium, zinc, copper, nickel, cobalt, iron, bismuth, lead, vanadium, or antimony, X represents a carboxylate group having from 2 to 20 carbon atoms, a halogen, or an alkoxide group having from 1 to 20 carbon atoms, and n is a number equal to the valence state of M can be readily modified by reaction of said metal catalyst with a bycyclic amide acetal of general formula

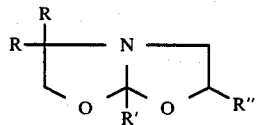

wherein R, R' and R" independently represent hydrogen, an alkyl group having from 1 to 20 carbon atoms, an alkyl ether group having from 1 to 20 carbon atoms, an aryl group having from 6 to 12 carbon atoms, an aryl ether group having from 6 to 12 carbon atoms, an alkaryl group having from 7 to 20 carbon atoms or an alkaryl ether group having from 7 to 20 carbon atoms.

Polyols useful in the formation of polyurethanes in accordance with this invention include those having at least two hydroxyl groups per molecule and having equivalent weights falling in the range of from 20 to 5000. Specific polyols include butane diol, cyclohexane dimethanol, tripropylene glycol, amide diols, urethane diols, polyether polyols such as poly (tetramethylene ether) diols, poly (propylene ether) polyols, polyester polyols, and the like.

Polyhydroxy polyethers are suitable polyols for use in this invention and preferably those having at least 2 hydroxyl groups per molecule Polyhydroxy polyethers can be prepared by polymerization of epoxides such as ethylene oxide, propylene oxide, butylene oxide, tetrahydrofuran, styrene oxide, or epichlorohydrin either on their own or by chemical addition to other materials. Suitable other materials include ethylene glycol, propylene glycol, trimethylol propanes and 4,4'-dihydroxy diphenyl propane. Sucrose polyethers also may be used. Polybutadienes having hydroxyl groups as well as other known hydroxyl containing vinyl addition polymerized polymers can be used.

According to the present invention, hydroxyl containing polyesters, polythioethers, polyacetals, polycarbonates or polyesteramides of the types known for the formation of polyurethanes are polyols which may also be used.

Particularly useful polyols for the present invention include the following representative aliphatic and aromatic polyhydric alcohols. Ethylene glycol, propylene glycol, trimethylene glycol, triethylene glycol, pentaethylene glycol, polyethylene glycol, 1,4-butanediol diethylene glycol, dipropylene glycol, 2,2-dimethyl-1,3-propanediol, hexamethylene glycol, 1,4-cyclohexane dimethanol, xylene alcohols, ethyl resorcinol, propyl resorcinol, 2,4-dimethyl resorcinol 3,6-dimethyl-1,2,4-benzene triol, ethyl pyrogallol, 2,4-methyl-1,4-dihydroxy naphthalene, 3-methyl-1,4,5-naphthalene triol, dimethylol toluene, dimethylol xylene, bis-hydroxy ethyl or bis-hydroxy propyl ethers of resorcinol, catechol, or hydroquinones, 1,5-dihydroxy naphthalene, 4,4'-isopropylidene-bis-phenol, and the like.

Polyisocyanates useful in this invention include organic isocyanates having at least two isocyanate groups per molecule. The polyisocyanates can be of low, high, or intermediate molecular weight and can be any of a wide variety of organic polyisocyanates including ethylene diisocyanate, trimethylene diisocyanate, dodecamethylene diisocyanate, hexamethylene diisocyanate, hexamethylene diisocyanate trimer, tetraethylene diisocyanate, pentamethylene diisocyanate, propylene-1,2-diisocyanate, 2,3-dimethyl tetramethylene diisocyanate, butylene-1,2-diisocyanate, butylene-1,3-diisocyanate, 1,4-diisocyanato cyclohexane, cyclopentene-1,3-diisocyanate, p-phenylene diisocyanate, 1-methyl phenylene-2,4-diisocyanate, naphthalene-1,4-diisocyanate, toluene diisocyanate, diphenyl-4,4'-diisocyanate, xylylene-1,3-diisocyanate, 4,4'-diphenylene methane diisocyanate, 4,4'-diphenylene propane diisocyanate, 1,2,3,4-tetraisocyanato butane, butane-1,2,3-triisocyanate, polymethylene polyphenyl isocyanate, and other polyisocyanate having an isocyanate functionality of at least two more fully disclosed in U.S. Pat. Nos. 3,350,362 and 3,382,215. Polyisocyanates which are polymeric in nature including isocyanate prepolymers of all types are included in this invention.

I have found that the addition of small amounts of a bicyclic amide acetal helps to improve the viscosity, solubility property and the catalytic reactivity of the metal salt catalyst in polyurethane formation. The catalytic properties improvement is not fully understood but is believed to be due to (a) synergistic catalytic effect of metal salt as well as bicyclic amide acetal, (b) complexation of the bicyclic amide acetal with the methal, (c) removal of free acid (in the case in which the catalyst is a metal carboxylate) produced by the degradation of the metal carboxylate, (d) stabilizing the metal salts against hydrolysis, and (e) improving the compatibility/solubility in the reaction mixture of the metal salts.

In a typical experiment, when zinc octoate catalyst which catalyzed the polyurethane polymerization reaction of a polyol mixed with liquid methylene bis(phenyl isocyanate) (0.13% by weight of the catalyst based on the combined polyol and polyisocyanate mixture) in 115 minutes, upon modification with 50% by weight of bicyclic amide acetal based on the weight of the zinc octoate catalyst provided gelation in 50 seconds. Similarly, ferric naphthoate catalyst, which contained solid particles, upon mixing with 50% by weight of bicyclic amide acetal resulted in a homogeneous liquid catalyst. This catalyst catalyzed the polyol/polyisocyanate reaction to give the polyurethane polymer with about 100% improvement in polymerization rate.

This invention is further illustrated in the following representative examples.

EXAMPLE 1

Bismuth octoate which showed the presence of free carboxylic acid by infrared analysis (a band at about 1705 cm$^{-1}$) was mixed at room temperature with 20% by weight of a bicyclic amide acetal of the foregoing formula wherein R and R'' represent hydrogen and R' represents a methyl group. Infrared analysis of this product showed the disappearance of the band at 1705 cm$^{-1}$ and the appearance of a new band at 1740 cm$^{-1}$ caused by the carboxylate ester which had formed by reaction of the bicyclic amide acetal with the free carboxylic acid.

EXAMPLE 2

The procedure of Example 1 was followed using 1:1 by weight of cobalt octoate and the bicyclic amide acetal. The infrared spectrum of the resulting liquid showed the disappearance of the original band at 1695 cm$^{-1}$ present in the cobalt octoate and the formation of a new band at 1736 cm$^{-1}$ due to the formation of the carboxylate ester group.

EXAMPLE 3

The procedure of Example 1 was followed using 20% by weight of the bicyclic amide acetal with lead octoate. The infrared spectrum of the modified catalyst showed the presence of a new band at 1740 cm$^{-1}$.

EXAMPLE 4

The modified catalysts of Examples 1-3 and others prepared similarly by mixing the metal salts with the bicyclic amide acetal were used as polyurethane catalysts in the reaction of a polyol mixture composed of a 1:1 weight ratio of dipropylene glycol and a 1000 molecular weight poly(propylene oxide) diol which mixture was subsequently mixed with liquid methylene bis(phenyl isocyanate) (NCO equivalent weight of about 144) at room temperature. In a typical experiment, the catalyst was dissolved in the polyol mixture and this was then mixed rapidly with the polyisocyanate. The cure speed was monitored by placing a thermocouple in the reaction mixture and the time required to give the maximum exotherm was considered to be the gel time. At the gel time, the reaction mixture turned into a gelled material. The results of the various experiments are given in the following Table. Examples 4,6, and 8 are given for comparative purposes and are otherwise outside the scope of the present invention.

TABLE 1

Polyol[a]/Polyisocyanate[b] Polymerization Rate Study Using Various Bicyclic Amide Acetal Modified Metal Catalysts

| Example No. | Catalyst (g) | Bicyclic Amide Acetal (g) | Gel Time (Min) | Max Exotherm Temp (°C.) |
|---|---|---|---|---|
| 4 | Zinc Octoate (0.02) | None | 1.5 | 120 |
| 5 | (0.01) | (R = R'' = H; R' = Me) (0.01) | 0.9 | 135 |
| 6 | Iron Napthoate (0.08) | — | 2.7 | 130 |
| 7 | (0.08) | (0.08) | 1.5 | 150 |
| 8 | Bismith Octoate (0.006) | (0.006) | 2 | 140 |
| 9 | Cobalt Octoate (0.023) | (0.023) | 1.3 | 125 |
| 10 | (0.019) | (0.004) | 1.4 | 150 |
| 11 | Lead Octoate (0.002) | (0.002) | 1 | 140 |
| 12 | Vanadium Octoate (0.09) | (0.09) | 2.5 | 150 |
| 13 | Potassium Octoate (0.1) | (0.1) | 1.6 | 150 |

[a]6.7 grams of a 1:1 by weight mixture of dipropylene glycol and 1000 hydroxy equivalent weight poly(propylene oxide) diol were used in all the experiments.
[b]8.8 grams of liquid methylene bis(phenyl isocyanate) (NCO functionality 2.1 per mole with equivalent weight of 144) were used in all the experiments.

I claim:

1. The process for preparing an improved catalyst composition comprising treating a metal salt having the formula $MX_n$ wherein M represents potassium, zinc, copper, nickel, cobalt, iron, bismuth, lead, vanadium or antimony, X represents a carboxylate group having from 2 to 20 carbon atoms, a halogen or an alkoxide group having from 1 to 20 carbon atoms, and n is a number equal to the valence state of M with a bicyclic amide acetal having the formula

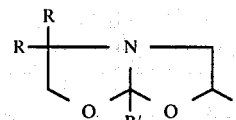

wherein R, R' and R" independently represent hydrogen, an alkyl group having from 1 to 20 carbon atoms, an alkyl ether group having from 1 to 20 carbon atoms, an aryl group having from 6 to 12 carbon atoms, an aryl ether group having from 6 to 12 carbon atoms, an alkaryl group having from 7 to 20 carbon atoms or an alkaryl ether group having from 7 to 20 carbon atoms.

2. The process of claim 1 wherein the metal salt is bismuth octoate and the bicyclic amide acetal is one in which R and R" represent hydrogen and R' represents a methyl group.

3. The process of claim 1 wherein the metal salt is cobalt octoate and the bicyclic amide acetal is one in which R and R" represent hydrogen and R' represents a methyl group.

4. The process of claim 1 wherein the metal salt is lead octoate and the bicyclic amide acetal is one in which R and R" represent hydrogen and R' represents a methyl group.

5. The process of claim 1 wherein the metal salt is zinc octoate.

6. The process of claim 1 wherein the metal salt is iron naphthoate.

7. The process of claim 1 wherein the metal salt is vanadium octoate.

8. The process of claim 1 wherein the metal salt is potassium octoate.

9. The catalyst composition produced by the process of claim 1.

* * * * *